United States Patent Office
3,662,034
Patented May 9, 1972

3,662,034
S-ALLYLIC AND S-VINYLIC O,S'-DIALKYL DITHIO-PHOSPHATES
Alexis A. Oswald, Mountainside, and Paul L. Valint, Jr., Woodbridge, N.J., assignors to Esso Research and Engineering Company
No Drawing. Filed Aug. 2, 1968, Ser. No. 749,575
Int. Cl. C07f 9/16; A01n 9/36; C10m 1/48
U.S. Cl. 260—957
20 Claims

ABSTRACT OF THE DISCLOSURE

S-allylic and S-vinylic O,O'-dialkyldithiophosphates can be selectively dealkylated to form their corresponding salts, which then can be reacted with alkyl halides to form S-allylic and S-vinylic O,S'-dialkyldithiophosphates. Both the dealkylated products and the alkylated products are novel compositions, useful as pesticides, especially as insecticides, and as antioxidants, lubricating oil additives, etc.

PRIOR ART

Dealkylation of alkyl dithiophosphates having no olefinic unsaturation is old, having been discovered by Carius more than a hundred years ago: L. Carius, Ann. Chem. Pharm. 112, 190 (1859). Dealkylation of saturated dithiophosphates with mercaptides, xanthate and dialkyldithiophosphate salts has been disclosed in German Pat. No. 1,136,328; German Pat. No. 1,141,364; and U.S. Pat. No. 3,309,371, respectively. The dealkylation of saturated thiophosphates with trimethylamine has been also described in French Pat. 1,450,400.

However, none of the resulting prior art thiophosphate ester products has ever had any allylic or vinylic substituents. The apparent reason for this is that successful dealkylation of allylic esters was not expected in view of the fact that allylic cations are much more stable than the alkyl cations; hence, owing to their stability, allylic cations would be expected to undergo elimination in preference to alkyl cations from such esters.

FIELD OF THE INVENTION

This invention is related to novel dealkylated products of S-allylic and S-vinylic O,O'-dialkyldithiophosphates, their alkylated derivatives, formulations or compositions of the dealkylated and alkylated products, and processes or methods for preparing and using the same. More particularly, this invention relates to the selective dealkylation of S-allylic and S-vinylic O,O'-dialkyldithiophosphates to form novel, corresponding dealkylated products, which are then reacted with alkyl halides to form novel S-allylic and S-vinylic O,S'-dialkyldithiophate products, both of which products are useful as pesticides, particularly as insecticides, and/or as antioxidants and lubricating oil additives.

SUMMARY OF THE INVENTION

The novel dealkylated and alkylated products of this invention are generally prepared in the course of a two-stage process wherein, in the first stage, S-allylic and S-vinylic dialkyldithiophosphates are dealkylated; and in the second stage, the dealkylated products are then alkylated.

Dealkylation

It was found that the dealkylation of S-alkenyl, i.e., S-allylic and S-vinylic dialkyldithiophosphates occurs selectively, without a significant elimination of the S-alkenyl groups. The dealkylation is depicted by the following general scheme:

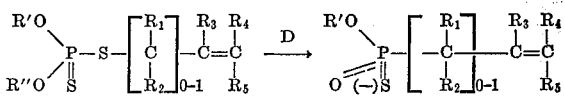

where: (a) R' and R" are each $C_1$ to $C_{30}$ monovalent aliphatic hydrocarbyl radicals, e.g., alkyl, alkenyl, alicyclic, aralkyl, and substituted derivatives thereof, which substituted derivatives may contain such representative substituents as halogen, nitrogen, alkylmercapto, carbalkoxy groups, etc.; preferably R' and R'$_2$ are $C_1$ to $C_{16}$ alkyl radicals, most preferable $C_1$ to $C_6$ alkyl radicals; (b) $R_1$ to $R_5$ are hydrogen, chlorine, cyano, $C_1$ to $C_3$ acyl, $C_1$ to $C_6$ carbalkoxy, $C_1$ to $C_3$ alkylmercapto, or $C_1$ to $C_{16}$ unsubstituted or substituted hydrocarbyl radicals, preferably alkyl and/or aryl radicals, and substituted derivatives thereof containing halogen, nitrogen, alkylmercapto, carbalkoxy groups, etc. $R_1$ to $R_5$ are most preferably $C_1$ to $C_4$ unsubstituted, monosubstituted, or disubstituted alkyl groups; (c) D is a dealkylating agent such as (1) a nitrogen base such as ammonia, amines, etc.; (2) a thiolate salt, such as the sodium salts of hydrocarbyl thiols and thiol acids; or (3) an inorganic salt such as lithium chloride, sodium iodide, calcium chloride, etc.

Dealkylation may occur with the elimination of either R' or R". If R' and R" are different n-alkyl groups, dealkylation involving the smaller alkyl group may preferably occur.

The dealkylated product is a partial ester of dithiophosphoric acid, i.e., an S-alkenyl-O-alkyl dithiophosphate. As such, it may exist either as an ionic salt or a hydrogen bonded complex of the corresponding acid. The composition of the salt or complex formed is dependent on the dealkylation agent used.

If a nitrogen base, such as $(R_6)_3N$, where $R_6$ is hydrogen, unsubstituted or substituted alkyl, is employed as a dealkylating agent, an ammonium salt or an amine complex of the dealkylated ester is formed. This is shown by the following reaction scheme:

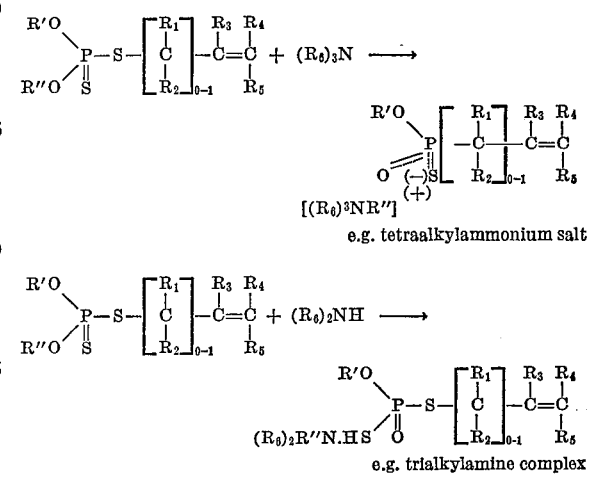

wherein $R_6$ is hydrogen, a $C_1$ to $C_9$ alkyl or monosubstituted alkyl. Of course, the tetraalkylammonium derivatives exist only in the salt form. The amine complex may exist in equilibrium with the corresponding ammonium salt. The equilibrium concentration of the salt will be directly proportional to the base strength of the nitrogen component and inversely proportional to the steric crowding of the salt. In general, the formation of the dealkylated products having a stronger ionic character occurs at a faster rate. Therefore, alkylamines having lower alkyl groups such as those in the $C_1$ to $C_4$ range are preferable to high molecular weight amines. Ammonia is also a preferred base, mainly because of its low cost. Substituted alkylamines, having alkyl groups in the $C_1$ to $C_4$ range, such as the hydroxyethyl amines are also suitable dealkylating agents. Finally, cyclic amines may be preferred to effect a fast reaction due to the absence of steric crowding. Such a cyclic amine having exposed nitrogen is triethylene diamine (1,4-diazabicyclo [2.2.2] octane).

As another type of a dealkylating agent a thiolate salt $R_7SM$, can also be used. The general reaction in this case can be shown by the following equation:

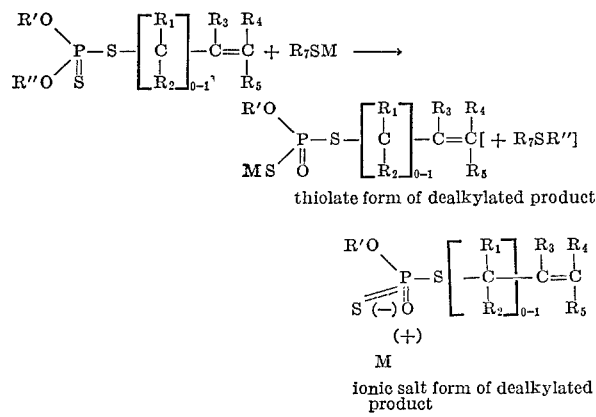

thiolate form of dealkylated product ionic salt form of dealkylated product wherein R', R", and $R_1$ to $R_5$ are as previously defined; $R_7$ is a $C_1$ to $C_9$ hydrocarbyl, preferably $C_1$ to $C_6$ alkyl, most preferably a $C_1$ to $C_2$ alkyl group or a $C_1$ to $C_5$ acyl group, such as $C_2H_5OC(S)$—, $(CH_3O)_2P(S)$— and M is a metal such as sodium, potassium, or $C_4$ to $C_{20}$ tetraalkylammonium having $O_1$ to $C_{12}$ alkyl groups. As thiolate dealkylating agents, sodium sulfide, sodium hydrogen sulfide and tetraalkylammonium sulfide may also be employed.

Te dealkylated product of the process using thiolates again has a varying ionic character dependent on the structures of the starting O,O'-dialkyl-S-alkenyl dithiophosphate and the thiolate salt. In the nondissociated form, the dealkylated product usually exists as a thiol rather than a thiono salt.

As a third type of dealkylating agent, a metal or tetraalkylammonium halide salt, MX, may be employed.

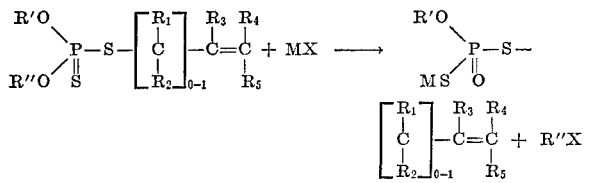

wherein R', R" and $R_1$ to $R_5$ are as before; M is an alkali or alkaline earth metal such as sodium, potassium, calcium, etc. or a $C_4$ to $C_{20}$ tetraalkylammonium group, etc.; and X is chlorine, bromine or iodine.

Alkylation

It has been found in the present invention that the alkylation of the novel S-allylic and S-vinylic O-alkyl dithiophosphate salts is highly selective since it occurs exclusively on the sulfur. The selective reactions can be indicated by the following scheme:

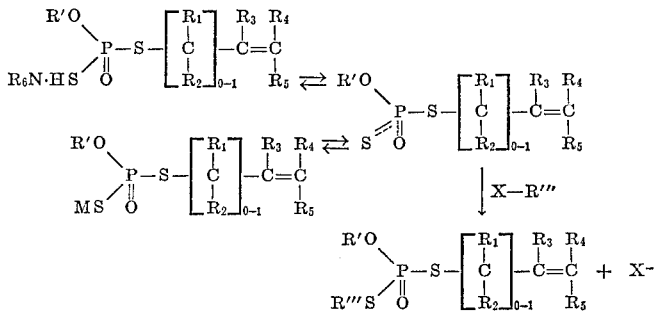

wherein (a) R', R" and $R_1$ to $R_6$ are the same as before; (b) R''' is a $C_1$ to $C_{30}$ monovalent aliphatic hydrocarbyl radical, e.g., alkyl, alkenyl, alicyclic, aralkyl and substituted derivatives thereof containing, e.g., alkylmercapto groups, R''' being preferably $C_1$ to $C_{16}$ alkyl and alkenyl radicals, most preferably $C_1$ to $C_{26}$ alkyl and allyl radicals, especially $C_1$ to $C_6$ alkyl and allyl radicals; and (c) X is the leaving group in the alkylating process, representative examples of X being, bromine, chlorine, iodine, sulfonate, phosphate, etc.

These alkylation reactions all involve the ambient S-alkenyl O-alkyl dithiophosphate anion as a common intermediate. This anion can, of course, be derived from an amine-acid complex or from a salt. It will displace the halide, sulfate, or sulfonate group of the alkylating agent. It is, of course, within the contemplation of this invention to use a mole of alkylene dihalide in place of two moles of alkyl monohalide.

Examples of reactants

Typical S-allylic and S-vinylic O,O'-dialkyldithiophosphate reactants that are employed in the dealkylation stage include, e.g.;

S-allyl-O,O'-dimethyl dithiophosphate,
S-allyl-O,O'-diethyl dithiophosphate,
S-crotyl-O,O'-dimethyl dithiophosphate,
S-crotyl,O,O'-diethyl dithiophosphate,
S-1-propenyl-O,O'-dimethyl dithiophosphate,
S-1-propenyl-O,O'-diethyl dithiophosphate,
S-1-propenyl-O,O'-di-1-propyldithiophosphate,
O,S-diallyl-O'-methyl dithiophosphate,
S-crotyl O,O'-dicyclohexyl dithiophosphate,
S-crotyl O,O'-dibenzyl dithiophosphate,
S-2-methallyl O,O'-di-4-chlorobenzyl dithiophosphate,
S-2-pentenyl O,O'-di-2-nitroethyl dithiophosphate,
S-cyanoallyl O,O'-dimethyl dithiophosphate,
S-carbomethoxyvinyl O,O'-diethyl dithiophosphate,
S-methylthiopropenyl O,O'-diethyl dithiophosphate,
S-chlorovinyl O,O'-dimethyl dithiophosphate,
acetylvinyl O,O'-dimethyl dithiophosphate,
methylsulfonylvinyl O,O'-diethyl dithiophosphate,
S-allyl O,O'-di-dodecyl dithiophosphate,
S-hexenyl O,O'-di-i-butyl dithiophosphate, etc.

Typical nitrogen bases useful as dealkylating agents include, e.g., ammonia, propylamine, diethylamine, trimethylamine, hexyl-dimethylamine, hydroxyethylamine, benzylamine, tetramethylethylenediamine, N-methyl pyrrolidine, triethylenediamine, hexamethylenetetramine, etc.

Examples of thiolate salts which can be used as dealkylating agents include, e.g., sodium methanethiolate, potassium ethanethiolate, sodium 2-propanethiolate, sodium xylenethiolate, potassium ethylxanthate, ammonium dimethyl dithiophosphate, potassium diethyl dithiophosphate, tetramethylammonium diisopropyl dithiophosphate, trimethylbenzylammonium sulfide, trimethylammonium dimethyl thiophosphate, etc.

Examples of metal halide dealkylating agents include, e.g., lithium chloride, sodium iodide, calcium chloride, etc.

Typical reactants (dealkylation products) for the alkylation step include, e.g.;

tetramethylammonium S-allyl-O-methyl dithiophosphate,
ethyltrimethylammonium S-allyl O-ethyl dithiophosphate,
methylammonium S-crotyl-O-methyl dithiophosphate,
N-ethyltriethylenediamine S-allyl-O-ethyl dithiophosphate salt,
N-ethyltriethylenediamine S-crotyl O-ethyl dithiophosphate salt,
N-ethyltriethylenediamine S-allyl O-ethyl dithiophosphate salt,
N-ethyltriethylenediamine S-1-propenyl O-ethyl dithiophosphate salt,
ethyltrimethylammonium S-1-propenyl O-ethyl dithiophosphate,
methyltriethylammonium S-1-propenyl O-ethyl dithiophosphate,
N-1-propyltriethylenediamine S-1-propenyl O-1-propyl dithiophosphate salt,
sodium S-allyl-O-methyl dithiophosphate,
potassium S-crotyl-O-methyl dithiophosphate,
allylmethylammonium S-crotyl O-allyl dithiophosphate,
cyclohexyl dimethylammonium S-propenyl O-cyclohexyl dithiophosphate,
benzyltriethylammonium S-hexenyl O-benzyl dithiophosphate,
hydroxyethylmethylammonium S-chlorovinyl O-methyl dithiophosphate,
butyltrimethylammonium S-propenyl O-butyl dithiophosphate,
N,N'-dimethyl-triethylene diammonium bis-(S-carbomethoxy-propenyl O-methyl)-dithiophosphate,
N-methylpyrrolidinium S-ethylthiovinyl O-methyl dithiophosphate,
dodecyldimethylammonium S-methallyl O-dodecyl dithiophosphate,
zinc bis-(S-propenyl O-isobutyl dithiophosphate),
basic zinc S-vinyl O-hexadecyl dithiophosphate, etc.

The alkylating agents useful in the second or alkylating stage include, e.g., methyl bromide, ethyl chloride, isopropyl iodide, hexadecyl chloride, allyl bromide, crotyl chloride, methallyl iodide, cyanoallyl chloride, hydroxyethyl chloride, methylthioethyl chloride, benzyl chloride, chlorophenylethyl chloride, methyl tosylate, ethylene dichloride, trimethylene dibromide, xylene dichloride, trimethyl dithiophosphate, trimethyl monothiophosphate, etc.

Process conditions

Dealkylation stage.—The reaction conditions for the first or dealkylation stage preferably include use of equimolar amounts of reactants, although an excess of the base reactant can be used with advantage. The dealkylation reaction can be run with or without a solvent; however, the use of a solvent can be of advantage, especially since the dithiophosphate salt products of the reaction are usually viscous liquids or crystalline solids. In the event a solvent is used, utilization of strongly polar, neutral organic solvents such as ethanol, acetonitrile, acetone, etc. is usually preferred. These solvents are good for the dissolution of the usually solid thiolate dealkylating agents as well.

Dealkylating temperatures can vary from about −50 to about +150° C. preferably from about +15 to about +90° C. Although it is preferred that the pressure employed be atmospheric pressure, superatmospheric pressures can be of advantage at times, as, for example, in reactions with ammonia, in which latter event the reactions can be best carried out in a pressure vessel to keep the ammonia in a liquid state.

Since the dealkylation reaction is in general an exothermic one, in order to facilitate control of the reaction temperature, it is preferable that one of the reactants be slowly added to the other as the reaction proceeds; when this is done, it is preferable that the dealkylating agent be the reactant that is usually added.

Although it is preferable that equimolar amounts of reactants be used, it is of advantage, when using a base reactant such as ammonia as a dealkylating agent, to use an excess of such base reactant since this accelerates the rate of dealkylation. After dealkyaltion, the excess dealkylating agent is removed since it usually interferes with the formation of neutral phosphate esters in the subsequent alkylation stage.

Alkylation stage.—The reaction conditions for the second or alkylation stage of this invention preferably include use of equimolar amounts of reactants, either with or without solvents. In the event a solvent is used, however, utilization of polar organic solvents such as nitriles, alcohols, ketones, etc., is usually preferred. In addition, hydrocarbons and their chlorinated derivatives, such as toluene, xylene, chlorobenzene, etc. are also suitable solvents.

Alkylating temperatures can vary from about 0 to about 150° C., preferably from about 20 to about 120° C. Although it is preferred that the pressure employed be atmospheric pressure, superatmospheric pressures can be of advantage in keeping volatile alkyl halide reactants in the liquid state.

A mixture of equimolar reactants can be brought up to a temperature where the alkylation occurs at a practically advantageous rate. It is often preferable, however, to heat up one reactant with or without solvent to the reaction temperature and then to add the other reactant. For example, to a hot solution of the dealkylated product the alkyl halide alkylating agent can slowly be added. Although usually equimolar or equivalent reactants are used, either of the two reactants can be used in excess. For example, an excess of the alkyl halide can be used to serve as a solvent as well.

Combination of dealkylation and alkylation

Besides a possible change of composition, dealkylation followed by alkylation leads to a structural isomerization of the phosphate ester. As a result of the combination of the two processes, i.e. dealkylation and alkylation, an S-alkenyl O,O'-dialkyl dithiophosphate is converted to an S-alkenyl O,S'-dialkyl dithiophosphate. If the alkyl group removed and the alkyl group placed back are the same, the combination is simply an O,S'-isomerization and as such can be carried out catalytically.

In the case of certain metal halide and metal dithiophosphate dealkylation agents, the by-product of dealkylation can act as an alkylating agent. The overall result will be isomerization of the S-alkenyl O,O'-dailkyl dithiophosphates to yield the corresponding S-alkenyl O,S'-dialkyl dithiophosphates:

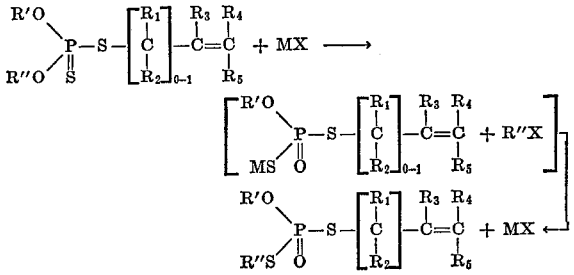

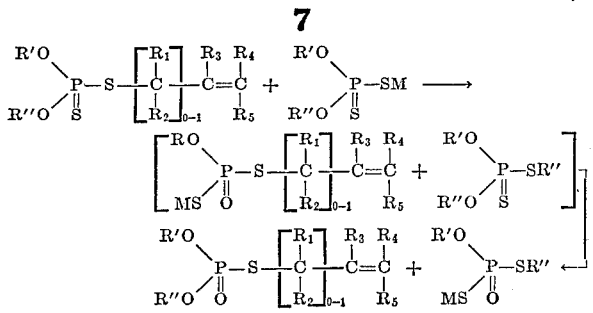

Since the metal or tetralkylammonium halide is regenerated, it acts as a true catalyst. It is important, however, to avoid the loss of the relatively volatile alkyl halide intermediate in order to realize a high yield catalytic isomerization. For this reason sealed reaction vessels can be used under superatmospheric pressures. The isomerization temperatures can vary between about 50° and about 150° C. The amount of the metal halide catalyst varies between about 0.1 to about 300 mole percent preferably between 1–5 mole percent. The metal halide is preferably sodium iodide, lithium chloride, or calcium chloride. The isomerization can be carried out in the presence or in the absence of solvents.

In the reaction with the dithiophosphate salt, both the S-alkenyl O,O'-dialkyl dithiophosphate ester and the dithiophosphate salt are isomerized in the reversible dealkylation process. Whether or not the isomerization is accompanied by a structural change is dependent upon whether the alkyl groups of the ester and of the salt are identical or not.

Another surprising feature provided by the processes of the present invention is the possibility of utilizing double dealkylation-alkylation. For example, the dealkylation-alkylation products of the S-alkenyl O,O'-dialkyl-dithiophosphate reaction can react further as shown by the following scheme:

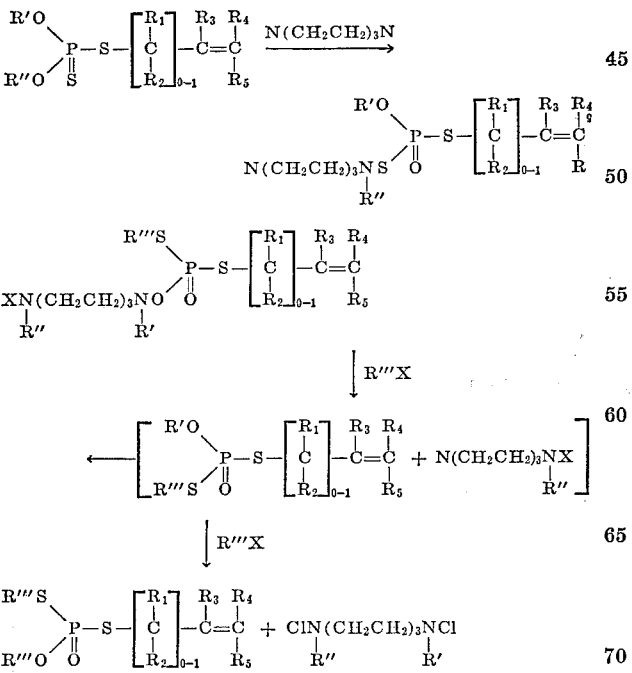

The second dealkylation-alkylation usually occurs at a slower rate than the first. It can be used for an exchange of alkyl groups and not for O,S'-isomerization. It can be carried out in general with an excess of nitrogen base and alkylating agent.

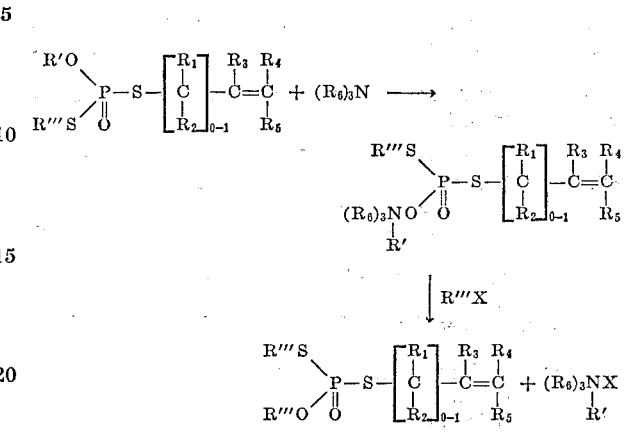

Similarly, furtherO-alkyl exchange can be effected with mono- and dithiophosphate salts. The reaction conditions for the second dealkylation-alkylation stage are within the limits described under the first, although using mild conditions the first O,S'-isomerization stage can be carried out selectively.

COMPOSITIONS

Dealkylation products.—The new dealkylation products, i.e., S-alkenyl O-alkyl dithiophosphates, novel compositions in this invention include compounds of the general formula

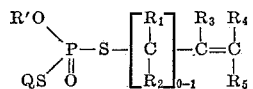

where:
(a) R' is a $C_1$ to $C_{30}$ monovalent aliphatic hydrocarbyl radical, e.g. alkyl, alkenyl, alicyclic, aralkyl, or substituted derivatives thereof containing such exemplary substituents as e.g., halogen, nitrogen, alkylmercapto, carboalkoxy groups R' preferably being a $C_1$ to $C_{16}$ alkyl radical, and most preferably being a $C_1$ to $C_6$ alkyl radical;
(b) $R_1$ to $R_5$ are hydrogen, chlorine, cyano, $C_1$ to $C_3$ acyl, $C_1$ to $C_6$ carboalkoxy, $C_1$ to $C_{16}$ monovalent unsubstituted or substituted hydrocarbyl radicals, preferably alkyl, aryl, and substituted drivatives thereof containing, e.g., halogen, nitrogen, alkylmercapto, or carboalkoxy groups, etc. and most preferably $C_1$ to $C_4$ unsubstituted, monosubstituted, or disubstituted alkyl groups;
(c) Q is a positively charged species such as a metal or a group containing a basic nitrogen: e.g. Q includes: (1) metals of the first and second groups of the Periodic Table such as Li, Na, K, Ca, Mg, Zn, etc.; and (2) ammonium groups such as $NH_4$, $CH_3NH_3$, $(C_2H_5)_3NH$, $(C_3H_7)_3NH$, $N(CH_2CH_2)_3NCH_3$ $(CH_3)_3NCH_2C_6H_5$(phenyl)

etc.
Dealkylation products of the above formula can exist as ionic salts, and as hydrogen bonded complexes in thiol and thiono form as discussed previously. With respect to geometrical configuration, the present dealkylated products can exist as cis- or trans-isomers or as mixtures thereof. It is to be understood that the present invention relates to any and/or all of these forms.

Preferred dealkylation products of the present invention include compounds of the following general structure:

$$\begin{array}{c} C_nH_{2n+1}O \\ \phantom{QS}\diagdown \\ \phantom{QS}\phantom{/}P-S-\left[CH_2\right]_{0-1}\overset{R_3}{\underset{R_2}{C}}-\overset{R_4}{\underset{R_5}{C=C}} \\ QS\diagup\phantom{|}\|\phantom{||} \\ \phantom{QS}O \end{array}$$

where $R_3$ to $R_5$ and $Q$ are as previously defined; $C_nH_{2n+1}$ is an alkyl group, preferably one having a primary alkyl structure; and $n$ is a positive integer of 1 to 30, preferably 1 to 16 and most preferably 1 to 6.

Especially preferred dealkylation products of this invention include compounds of the following general structure:

$$\begin{array}{c} C_mH_{2m+1}O \\ \phantom{QS}\diagdown \\ \phantom{QS}\phantom{/}P-S-\left[CH_2\right]_{0-1}-CH=CH-R_5 \\ QS\diagup\phantom{|}\| \\ \phantom{QS}O \end{array}$$

where $Q$ and $R_5$ are as previously defined and $m$ is a positive integer of from 1 to 6.

Representative non-limiting examples of dealkylation products of this invention have been enumerated previously, viz., in the description provided with respect to the typical reactants utilized in alkylation.

The present alkylation products of this invention, i.e. the S-alkenyl O,S'-dialkyl dithiophosphate esters are characterized by the formula $$\begin{array}{c} R'O \\ \phantom{R'''S}\diagdown \\ \phantom{R'''S}\phantom{/}P-S-\left[\overset{R_1}{\underset{R_2}{C}}\right]_{0-1}\overset{R_3}{\underset{\phantom{|}}{-}}\overset{R_4}{\underset{R_5}{C=C}} \\ R'''S\diagup\phantom{|}\| \\ \phantom{R'''S}O \end{array}$$

where R', $R_1$ to $R_5$ are as previously defined and R''' is a $C_1$ to $C_{30}$ monovalent aliphatic hydrocarbyl radical, e.g. alkyl, alkeynl, alicyclic, aralkyl, or substituted forms thereof containing, e.g. alkylmercapto groups, R''' preferably being $C_1$ to $C_{16}$ alkyl or alkenyl radicals, and most preferably being $C_1$ to $C_6$ alkyl or allyl radicals.

Preferred alkylated products of this invention include S-alkenyl O,S'-dialkyl dithiophosphates having a molecular weight below 600 and a general formula of $$\begin{array}{c} C_nH_{2n+1}O \\ \phantom{C_nH_{2n+1}S}\diagdown \\ \phantom{C_nH_{2n+1}S}\phantom{/}P=S-\left[CH_2\right]_{0-1}\overset{Y_1}{\underset{\phantom{|}}{-}}\overset{Y_2}{\underset{Y_3}{C=C}} \\ C_nH_{2n+1}S\diagup\phantom{|}\| \\ \phantom{C_nH_{2n+1}S}O \end{array}$$

where $Y_1$ to $Y_3$ are hydrogen, methyl, chlorine, cyano; and $n$ is a positive integer of from 1 to 30, preferably from 1 to 16, most preferably from 1 to 6.

Especially preferred alkylation products are compounds of the formula $$\begin{array}{c} C_nH_{2n+1}O \\ \phantom{C_nH_{2n+1}S}\diagdown \\ \phantom{C_nH_{2n+1}S}\phantom{/}P-S-\left[CH_2\right]_{0-1}-CH=CH-Y_3 \\ C_nH_{2n+1}S\diagup\phantom{|}\| \\ \phantom{C_nH_{2n+1}S}O \end{array}$$

Most preferred alkylation products are compounds of the general formula $$\begin{array}{c} CO_3-\left[CH_2\right]_{0-1}-O \\ \phantom{C_mH_{2m+1}CH_2S}\diagdown \\ \phantom{C_mH_{2m+1}CH_2S}\phantom{/}P-S-\left[CH_2\right]_{0-1}-CH=CH-Y_3 \\ C_mH_{2m+1}CH_2S\diagup\phantom{|}\| \\ \phantom{C_mH_{2m+1}CH_2S}O \end{array}$$

where $m$ is 1 to 4.

Additional preferred alkylation products include within the purview of this invention are the S', S'-alkylene bis-(S-alkenyl O-alkyl dithiophosphates) of the general formula $$\begin{array}{c} \overset{Y_2}{\underset{Y_3}{C}}=\overset{Y_1}{\underset{\phantom{|}}{C}}-\left[CH_2\right]_{0-1}-S-\overset{(CH_2)_{0-1}CH_3}{\underset{\|}{P}}-S-Z-S-\overset{(CH_2)_{0-1}CH_3}{\underset{\|}{P}}-S\left[CH_2\right]_{0-1}\overset{Y_1}{\underset{\phantom{|}}{-}}\overset{Y_2}{\underset{Y_3}{C=C}} \\ \phantom{xxxxxxxxxxxxxxxxx}O\phantom{xxxxxxxxx}O \end{array}$$

where $Y_1$ to $Y_3$ are as above; and Z is a divalent $C_1$ to $C_8$ aliphatic hydrocarbyl radical such as polymethylene, cyclohexylene, xylylene, etc., most preferably methylene or ethylene.

Non-limiting examples of the S-alkenyl O,S'-dialkyl dithiophosphates include, e.g.:

S-allyl O,S'-diethyl dithiophosphate,
S-methallyl O,S'-didodecyl dithiophosphate,
S-chloroallyl O,S'-dihexadecyl dithiophosphate,
S-vinyl O,S'-dimethyl dithiophosphate,
S-vinyl O,S'-dioctadecyl dithiophosphate,
S-propenyl O,S'-diethyl dithiophosphate,
S-butenyl O,S'-dibenzyl dithiophosphate,
S-hexenyl O,S'-dichlorobenzyl dithiophosphate,
S-allyl O-methyl S'-isopropyl dithiophosphate,
S-crotyl O-ethyl S'-n-propyl dithiophosphate,
S-4-phenylcrotyl O-ethyl S'-butyl dithiophosphate,
S-vinyl O-ethyl S'-phenyl dithiophosphate,
S-cyanovinyl O-methyl S'-propyl dithiophosphate,
S-methylthiopropenyl O-ethyl S'-methyl dithiophosphate,
S-carboethoxyvinyl O,S'-dimethyl dithiophosphate,
S-chlorovinyl O-ethyl S'-propyl dithiophosphate,
S-hexenyl O-ethyl S'-methyl dithiophosphate,
S',S'-methylene bis-(S-vinyl O-methyl dithiophosphate),
S',S'-ethylene bis-(S-propenyl O-ethyl dithiophosphate),
S',S'-trimethylene bis-(S-cyanovinyl O-ethyl dithiophosphate),
S',S'-xylylene bis-(S-crotyl O-ethyl dithiophosphate),
S',S'-1,4-cyclohexylene bis-(S-methyl S-allyl O-methyl dithiophosphate).

The above alkylated products, like their dealkylated counterparts, can also exist as "cis," or "trans" isomers or as mixtures thereof, as previously defined.

As previously noted, the S-alkenyl O-alkyldithiophosphate dealkylation products and the S-alkenyl O,S'-dialkyl-dithiophosphate alkylation products of this invention are useful as pesticides, particularly as insecticides, miticides and nematocides.

Since many known phosphorus compounds possess pesticidal, particularly insecticidal, activity, the fact that the foregoing products also exhibit pesticidal activity is not in itself surprising. However, the pesticidal activity of S-alkenyl O-alkyl dithiophosphate salts or complexes is considered very surprising since, in general, phosphate salts which are at least partly ionized do not show such activity as was exhibited by the foregoing S-alkenyl O-alkyl dithiophosphate salts or complexes.

Even more unexpected was the degree of activity shown by the present S-alkenyl O,S'-dialkyl dithiophosphate esters. These esters were found to be much more effective pesticides than the known isomeric S-alkenyl O,O'-dialkyl dithiophosphates. Equally important and unexpected was the finding that the instant S-alkenyl O,S'-diethyl dithiophosphates are less toxic to warm blooded animals than the corresponding isomeric S-alkenyl O,O'-diethyl dithiophosphates.

When used as insecticides, the biologically active S-alkenyl O-alkyl dithiophosphates and S-alkenyl O,S'-dialkyl dithiophosphates are preferably formulated with a suitable carrier or diluent or combinations thereof.

The term "carrier" or "diluent" as used herein means a material, which can be inorganic or organic and synthetic or of natural origin, with which the active S-alkenyl O-alkyl dithiophosphate salts and/or S-alkenyl O,S'-dialkyl-dithiophosphate esters are mixed or formlulated to facilitate their storage, transport, and handling and application to the insect(s) to be treated. The carrier is preferably biologically and chemically inert and, as used, can be a solid or fluid. When solid carriers are used, they are preferably particulate, granular, or pelleted; however, other shapes and sizes or solid carrier can be employed as well. Such preferable solid carriers can be naturally occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the S-alkenyl O-alkyl dithiophosphate salt and/or the S-alkenyl O,S'-dialkyl dithiophosphate ester.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

For application as a soil insecticide, the preferable carrier should be a granular inert carrier for example 25/50 mesh (U.S. sieve size) or can also be a simple or compound fertilizer which can be a solid, preferably granular or pelleted, or a liquid, as for example an aqueous solution in which the toxicant is suspended or emulsified.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active S-alkenyl O-alkyl dithiophosphate salt and/or S-alkenyl O,S'-dialkyl dithiophosphate ester ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active S-alkenyl O-alkyl dithiophosphate salts or S-alkenyl O,S'-dialkyl dithiophosphate ester ingredient and a finely powdered solid carrier such as aforedescribed.

The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of S-alkenyl O-alkyl dithiophosphate salt and/or S-alkenyl O,S'-dialkyl dithiophosphate ester mixed with a dispersing, i.e., deflocculating or suspending, agent, and, if desired, a finely divided solid carrier and/or a wetting agent. The S-alkenyl O-alkyl dithiophosphate salts and/or S-alkenyl O,S'-dialkyl dithiophosphates can be in particulate form or adsorbed on the carrier and preferably constitute at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonates, castor oil, sodium dodecyl benzene sulfonate, etc.

Granulater or pelleted compositions comprising a suitable carrier having the active S-alkenyl O-alkyl dithiophosphate salt and/or S-alkenyl O,S'-dialkyl dithiophosphate ester ingredient incorporated therein are also included in this invention. These can be prepared by impregnating a ganular carrier with a solution of the S-alkenyl O-alkyl dithiophosphate salt and/or S-alkenyl O,S'-dialkyl dithiophosphate or by granulating a mixture of a finely divided solid carrier and the active S-alkenyl O-dialkyl dithiophosphate salt and/or S-alkenyl O,S'-dialkyl dithiophosphate. The carrier used can consist of or contain a fertilizer or contain a fertilizer or fertilizer mixture, as for example, a superphosphate.

The compositions of this invention can also be formulated as solutions of the active S-alkenyl O-alkyl dithiophosphate salt and/or S-alkenyl O,S'-dialkyl dithiophosphate ester ingredient in an organic solvent or mixture of solvents, such as for example alcohols; ketones, especially acetone; ethers, hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active S-alkenyl O-alkyl dithiophosphate salt and/or S-alkenyl O,S'-dialkyl dithiophosphate ester ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active S-alkenyl O-alkyl dithiophosphate salt and/or S-alkenyl O,S'-dialkyl dithiophosphate ester ingredient is preferably in a non-aqueous phase.

As in the case of the pesticide uses previously discussed, additive uses of phosphorus compounds as antioxidants, antiwear agents, extreme pressure agents, etc., is also well known, in general. The new compounds of the present invention, however, are of special interest, because they are surprisingly more thermally stable than the corresponding non-isomerized compounds. Also the presence of the S-alkenyl groups provides special benefits as far as high level additive action and low level toxicity to warm blooded animals are concerned.

Finally, the relatively low toxicity of the novel compositions makes them attractive also for use as animal health agents.

The present invention is further illustrated in greater detail by the following examples, but it is to be understood that the present invention, in its broadest aspects, is not necessarily limited in terms of the reactants, or specific temperatures, residence times, separation techniques, and other process conditions, or dosage levels, exposure times, insects, mites, etc., by which the compounds and/or compositions described and claimed are prepared and/or used.

EXAMPLE 1

Dealkylation of S-crotyl, O,O'-dimethyl dithiophosphate with ammonia and its subsequent alkylation with methyl bromide Into an evacuated Pyrex pressure tube, equipped with a magnetic stirrer and containing 42.4 grams (0.2 mole) of S-crotyl O,O'-dimethyl dithiophosphate, 6.8 grams (0.4 mole) of ammonia were condensed, using a Dry Ice-isopropanol cooling bath. The sealed contents were then thoroughly mixed and placed into a water bath at ambient temperature. Transient blue coloration of the reaction mixture during the first hour indicated the reaction.

After standing three days, all the volatile components were removed from the mixture at 0.5 mm. pressure. The weight loss corresponded to the 3.4 grams (0.2 mole) excess of ammonia. A nuclear magnetic resonance (N.M.R.) spectrum of the liquid residue indicated that the dealkylation product was methyl ammonium S-crotyl O-methyl dithiophosphate.

The above intermediate product was dissolved in 100 ml. of acetonitrile. To the solution 25.5 grams (0.27 mole) of methyl bromide were condensed. The sealed mixture was then heated at 60° C. for 4 hours. The resulting crude product mixture was diluted with 500 ml. of water and the neutral ester phase separated. The water phase was washed with 300 ml. ether. The combined organic phases were diluted with 200 ml. ether, washed, in turn, with 200 ml. water and 100 ml. 5% aqueous sodium hydrogen carbonate solution. The ether solution was then dried and fractionally distilled. Vacuum distillation yielded 90.0 grams (41.5%) of S-crotyl O,S'-dimethyl dithiophosphate as a colorless liquid boiling at 91–93° C. at 0.3 mm. The structure of the product was confirmed by its N.M.R. spectrum.

EXAMPLE 2

Dealkylation of S-crotyl O,O'-diethyl dithiophosphate with triethylenediamine and its subsequent alkylation with methyl bromide To 48 grams (0.2 mole) of S-crotyl O,O'-diethyl dithiophosphate 22.4 grams (0.2 mole) of crystalline triethylenediamine were added. The reaction mixture was then stirred until all the diamine dissolved. A highly viscous, clear liquid product resulted. N.M.R. analysis indicated that the product was the monoammonium salt of N-ethyl triethylenediamine with S-crotyl-O-ethyl dithiophosphoric acid.

To a solution of the above salt in 75 ml. acetonitrile, 36.1 grams (0.39 mole) of methyl bromide were condensed. The sealed mixture was then heated at 60° C. for 3 hours. The product mixture was diluted with water and the neutral ester separated. The water phase was washed with 500 ml. ether. The combined organic phases were then washed with 200 ml. water and 100 ml. 5% aqueous sodium hydrogen carbonate solution. The neutral ethereal product was then dried and distilled. Fractional distillation in vacuo yielded 33 grams (73%) of S-crotyl O-ethyl S'-methyl dithiophosphate as a colorless liquid, B.P. 86–88°/0.2 mm. The structure of the product was confirmed by its N.M.R. spectrum.

EXAMPLE 3

Dealkylation of S-1-propenyl O,O'-diethyl dithiophosphate with triethylene diamine and is subsequent alkylation with ethyl bromide To 113.0 g. (0.5 mole) of S-1-propenyl O,O'-diethyl dithiophosphate dissolved in 400 ml. of acetonitrile 56.0 g. (0.5 mole) of triethylene diamine were added at ambient temperature. The solution was allowed to stir at ambient temperature for 20 hours, after which 109 g. (1.0 mole) of ethyl bromide was added. The solution then was heated to 57° C. for 2.5 hours, cooled to ambient temperature, and 50 ml. of water were added to dissolve the white solid that precipitated. The two layers were separated, and the aqueous layer was extracted with 500 ml. of diethyl ether. The ether extract and organic layer were combined and washed with 100 ml. of 5% sodium bicarbonate. The ethereal solution was then dried and fractionally distilled. Vacuum distillation yielded 60.1 g. (53%) of S-1-propenyl O,S'-diethyl dithiophosphate as a colorless liquid, B.P. 83–85/0.07 mm. The structure of the product was confirmed by its N.M.R. spectrum.

EXAMPLE 4

In this example, a number of S-alkenyl O,S'-dialkyl dithiophosphates were synthesized in accordance with the procedures previously described in Examples 1, 2 and 3. The structures of the final products were confirmed by their N.M.R. spectrum. The products of these syntheses are shown in Table I.

TABLE 1

| General formula of final product | Dealkylating reagent | Alkylating reagent | B.P., °C. (mm.) |
|---|---|---|---|
| $\begin{array}{c}CH_3O\\ \diagdown\\ \quad PSCH_2CH{=}CHCH_3\\ \diagup \parallel\\ C_2H_5S \quad O\end{array}$ | $KSC(S)OC_2H_5$ | $C_2H_5Br$ | 94–95 (0.3) |
| $\begin{array}{c}C_2H_5O\\ \diagdown\\ \quad PSCH_2CH{=}CHCH_3\\ \diagup \parallel\\ CH_3S \quad O\end{array}$ | $N(CH_2CH_2)_3N$ | $CH_3Br$ | 92–93 (0.2) |
| $\begin{array}{c}C_2H_5O\\ \diagdown\\ \quad PSCH_2CH{=}CHCH_3\\ \diagup \parallel\\ C_2H_5S \quad O\end{array}$ | $1/2 N(CH_2CH_2)_3N$ | $C_2H_5Br$ | 87–89 (0.15) |
| $\begin{array}{c}CH_3O\\ \diagdown\\ \quad PSCH{=}CHCH_3\\ \diagup \parallel\\ CH_3S \quad O\end{array}$ | $NH_3$ | $CH_3I$ | 75–76 (0.1) |
| $\begin{array}{c}CH_3O\\ \diagdown\\ \quad PSCH{=}CHCH_3\\ \diagup \parallel\\ C_2H_5S \quad O\end{array}$ | $NH_3$ | $C_2H_5Br$ | 87–88 (0.1) |
| $\begin{array}{c}C_2H_5O\\ \diagdown\\ \quad PSCH{=}CHCH_3\\ \diagup \parallel\\ CH_3S \quad O\end{array}$ | $N(CH_2CH_2)_3N$ | $CH_3I$ | 88–89 (0.1) |

EXAMPLE 5

Dealkylation of S-propenyl O,O'-diethyl dithiophosphate with triethylenediamine and its subsequent alkylation with methylthioethyl chloride 22.6 g. (0.1 mole) of S-1-propenyl O,O'-diethyl dithiophosphate is dealkylated with 11.2 g. (0.1 mole) of triethylenediamine in 80 ml. acetonitrile in the manner described in the previous example. To the resulting solution of the N-ethyl triethylenediamine S-propenyl O-ethyl dithiophosphate salt, 22.1 g. (0.2 mole) of methylthioethyl chloride is added. After 3 hour heating of the alkylation mixture the solvent, starting materials, and by-products are removed in the usual manner to leave liquid S-propenyl O-ethyl S'-methylthioethyl dithiophosphate as a residual product. The structure of the final product is confirmed by its N.M.R. spectrum.

EXAMPLE 6

Dealkylation of S-propenyl O,S'-diethyl dithiophosphate with lithium chloride

A mixture of 22.6 g. (0.1 mole) of S-propenyl diethyldithiophosphate ester and 8.5 g. (0.3 mole) of anhydrous lithium chloride in 250 ml. ethoxyethanol is heated for 3 hours at 100° C. Then the ethoxyethanol is removed in vacuo below 100° C. and the residual product is taken up in water. The water solution is extracted with ether to remove the starting ester. On subsequent removal of the water in vacuo lithium S-propenyl O-ethyl dithiophosphate salt is obtained. The structure of the final product is confirmed by its N.M.R. spectrum.

EXAMPLE 7

Preparation of 4-chlorobenzylisothiouronium S-crotyl O-methyl dithiophosphate

To a solution of 22.0 g. (0.1 mole) of sodium S-crotyl O-methyl dithiophosphate in 100 ml. of acetonitrile was added 23.8 g. (0.1 mole) of 4-chlorobenzylthiuronium chloride in 100 ml. of methanol at ambient temperature. A white solid precipitated immediately which was filtered from the solution. The solvents were removed under vacuum and pentane was added to crystallize the resulting oil. The white solid was filtered and dried to a weight of 36.8 g. (92%), M.P. 83–85° C. The structure of the final product was confirmed by its N.M.R. spectrum.

EXAMPLE 8

Dealkylation of S-propenyl O,O'-diethyl dithiophosphate with trimethylamine

S-propenyl O,O'-diethyl dithiophosphate (113.0 g., 0.5 mole) was placed in a Pyrex tube. The tube was evacuated to 0.1 mm., cooled in a Dry-Ice bath, and then 29.5 g. (0.5 mole) of trimethylamine were condensed into the tube. The reaction mixture was kept at ambient temperature for 2 days. The mixture solidified and was removed by dissolution with hot ethanol. Then the ethanol was removed under vacuum. The residual oil crystallized on the addition of diethyl ether. The solid was filtered and dried in a vacuum desiccator to a weight of 62.4 g. (44%) S-propenyl O-ethyl S'-benzyl dithiophosphate, M.P. 70–71° C. The structure of the final product was confirmed by its N.M.R. spectrum.

EXAMPLE 9

Alkylation of trimethylethylammonium S-propenyl O-ethyl dithiophosphate with benzyl chloride To a solution of 28.5 g. (0.1 mole) of trimethylethylammonium S-propenyl O-ethyl dithiophosphate in 150 ml. of absolute ethanol was added 12.7 g. (0.1 mole) of benzyl chloride at ambient temperature. The solution was heated to 70° C. for 4 hours. The ethanol was removed under vacuum, and the residual oil was dissolved in 300 ml. of diethyl ether and washed with 100 ml. of water and 50 ml. of 5% aqueous sodium bicarbonate. The ethereal layer was separated, dried, and the solvent removed under vacuum, leaving the product as a colorless liquid in the residue. The structure of the final product was confirmed by its N.M.R. spectrum.

EXAMPLE 10

Alkylation of trimethylethylammonium S-propenyl O-ethyl dithiophosphate with ethylene dibromide A reaction of 28.5 g. (0.1 mole) of trimethylethylammonium S-propenyl O-ethyl dithiophosphate and 9.4 g. (0.05 mole) ethylene dibromide in the manner described in the previous example yields S',S'-ethylene bis-(S-propenyl O-ethyl dithiophosphate) as a liquid residual product. The structure of the final product is confirmed by its N.M.R. spectrum.

EXAMPLE 11

Dealkylation-alkylation of S-alkenyl O,O'-dialkyl dithiophosphates with triethylenediamine-alkyl bromide (Procedure A)

A mixture of an S-alkenyl O,O'-dialkyl dithiophosphate (0.25 mole) and 28 g. (0.25 mole) of triethylene diamine was stirred at ambient temperature for 24 hours. This resulted in the formation of a viscous liquid salt which was then dissolved in 300 ml. of acetonitrile. To the solution, 0.5 mole of an alkyl bromide was added at ambient temperature. The reaction mixture was then heated to 70° C. for 4 hours. The precipitated diammonium bromide was dissolved in 75 ml. of water and separated from the organic layer. The aqueous layer was extracted with 500 ml. of diethyl ether. The extract was combined with the organic layer and washed with 50 ml. of 5% aqueous sodium bicarbonate. The ethereal solution was dried and the solvents were removed under reduced pressure. The crude product was purified by vacuum distillation and the structure of the final product confirmed by N.M.R. spectroscopy.

Yields and some physical and analytical data of S-propenyl O,S'-dialkyl dithiophosphates prepared via this general procedure are set forth in Table II below. Similarly, Table III below lists yields and physical data of some S-allyl O,S'-dialkyl dithiophosphates, which were synthesized using this procedure. The first and the last compound in Table II were synthesized using methyl iodide and allyl chloride, respectively, as the alkylating agent.

TABLE III.—YIELDS AND PHYSICAL DATA OF S-ALLYL O,S'-DIALKYL DITHIOPHOSPHATE ESTERS

| Structure | Yield, percent | Boiling point, °C. (mm.) |
|---|---|---|
| $C_2H_5O\!\!>\!\!P(S)(O)SCH_2CH=CH_2$ ; $CH_3S$ | 80 | 78–81 (0.15) |
| $C_2H_5O\!\!>\!\!P(S)(O)SCH_2CH=CH_2$ ; $C_2H_5S$ | 73 | 73–75 (0.075) |
| $C_2H_5O\!\!>\!\!P(S)(O)SCH_2CH=CH_2$ ; $n\text{-}C_3H_7S$ | 62 | 96–97 (0.15) |
| $C_2H_5O\!\!>\!\!P(S)(O)SCH_2CH=CH_2$ ; $i\text{-}C_3H_7S$ | 52 | 76–78 (0.06) |
| $CH_3O\!\!>\!\!P(S)(O)SCH_2CH=CH_2$ ; $CH_3S$ | 59 | 73 (0.15) |
| $CH_3O\!\!>\!\!P(S)(O)SCH_2CH=CH_2$ ; $C_2H_5S$ | 23 | 68–70 (0.10) |
| $n\text{-}C_3H_7O\!\!>\!\!P(S)(O)SCH_2CH=CH_2$ ; $n\text{-}C_3H_7S$ | 18 | 94–6 (0.1) |
| $n\text{-}C_3H_7O\!\!>\!\!P(S)(O)SCH=CHCH_3$ ; $n\text{-}C_3H_7S$ | 60 | 98–102 (0.05) |

TABLE II.—YIELDS, PHYSICAL AND ANALYTICAL DATA OF S-PROPENYL O,S-DIALKYL DITHIOPHOSPHATE ESTERS

| Structure | Yield, percent | Boiling point, °C. (mm.) | Calculated C | Calculated H | Calculated P | Found C | Found H | Found P |
|---|---|---|---|---|---|---|---|---|
| $C_2H_5O\!\!>\!\!P(S)(O)SCH=CHCH_3$ ; $CH_3S$ | 68 | 81 (0.2) | 33.95 | 6.17 | 14.58 | 34.43 | 6.40 | 14.58 |
| $C_2H_5O\!\!>\!\!P(S)(O)SCH=CHCH_3$ ; $C_2H_5S$ | 53 | 83–5 (0.08) | 37.11 | 6.68 | 13.68 | 37.27 | 6.83 | 14.10 |
| $C_2H_5O\!\!>\!\!P(S)(O)SCH=CHCH_3$ ; $n\text{-}C_3H_7S$ | 50 | 88–92 (0.05) | | | | | | |
| $C_2H_5O\!\!>\!\!P(S)(O)SCH=CHCH_3$ ; $n\text{-}C_5H_{11}S$ | 50 | 103–8 (0.07) | 44.75 | 7.88 | 11.54 | 45.79 | 8.23 | 11.24 |
| $C_2H_5O\!\!>\!\!P(S)(O)SCH=CHCH_3$ ; $n\text{-}C_4H_9S$ | 82 | 99–102 (0.05) | 42.49 | 7.53 | 12.17 | 42.78 | 7.95 | 11.94 |
| $C_2H_5O\!\!>\!\!P(S)(O)SCH=CHCH_3$ ; $i\text{-}C_3H_7S$ | 52 | 77–78 (0.01) | 40.10 | 7.07 | 12.88 | 40.30 | 7.26 | 12.29 |
| $C_2H_5O\!\!>\!\!P(S)(O)SCH=CHCH_3$ ; $i\text{-}C_4H_9S$ | 50 | 94–5 (0.05) | 42.50 | 7.57 | 12.17 | 41.59 | 7.70 | 12.31 |
| $C_2H_5O\!\!>\!\!P(S)(O)SCH=CHCH_3$ ; $CH_2=CHCH_2S$ | 63 | 88–89 (0.1) | | | | | | |

EXAMPLE 11-B

Double dealkylation-alkylation of S-allyl O,O'-dimethyl dithiophosphate with triethylene diamine-1-propyl bromide A mixture of 39.6 g. (0.2 mole) of S-allyl O,O'-dimethyl dithiophosphate and 22.4 g. (0.2 mole) of triethylenediamine was stirred at ambient temperature for 48 hours. The resultant viscous oil was dissolved in 200 ml. of acetonitrile and 39.2 g. (0.4 mole) of 1-propyl bromide were added at ambient temperatures. The mixture was then heated to 60° C. for 18 hours. After cooling to ambient temperature, 25 ml. of water were added and the aqueous solution was extracted with 200 ml. of diethyl ether. The ether and organic layers were combined and washed with 50 ml. of 5% aqueous sodium bicarbonate. The ethereal solution was then dried and the solvent was removed under vacuum (0.1 mm.) to yield 15.0 g. of crude product. Vapor phase chromatography indicated the product to be 60% pure (18% yield). The product was purified by vacuum distillation, B.P. 94–96° C. at 0.1 mm. The product was S-allyl-O,S'-di-1-propyl dithiophosphate as shown by N.M.R. spectroscopy.

EXAMPLE 12

Dealkylation-alkylation of S-alkenyl O,O'-dialkyl dithiophosphates with sodium ethanethiolate-alkyl bromide (Procedure B)

Sodium methoxide, 13.5 (0.25 mole) was dissolved in 150 ml. of anhydrous methane and 15 g. (0.275 mole) of ethanethiol was added at ambient temperature under a nitrogen atmosphere. To the solution 0.25 m. of S-alkenyl O,O'-dialkyl dithiophosphate was added. The reaction mixture was then heated to 65° C. for 2 hours. The solvent was removed under reduced presure and replaced with 300 ml. of absolute ethanol. To this solution 0.25 mole of an alkyl bromide was added at ambient temperature. The solution was heated to 70° C. for 4 hours. The solid was filtered off and the solvent was removed under reduced pressure. The residual oil was dissolved in 300 ml. of diethyl ether and washed with 100 ml. of water and 100 ml. of 5% aqueous sodium bicarbonate. The ethereal layer was separated and dried. The ether was removed under vacuum and the product was purified by vacuum distillation and the structure of the final product confirmed by its N.M.R. spectrum. Table IV shows yields and boiling points of some of the S-crotyl O,S'-dialkyl dithiophosphates prepared by this method (i.e., Procedure B). The same table also gives some comparative yields of compounds prepared in accordance with the procedure (i.e., Procedure A) described in Example 11. The data show that the two procedures are about equivalent with respect to yields.

TABLE IV.—YIELDS AND PHYSICAL DATA OF S-CROTYL O,S'-DIALKYL DITHIOPHOSPHATES

| Structure | Procedure A | Procedure B | Boiling point, ° C.(mm.) |
|---|---|---|---|
| $\begin{array}{c} C_2H_5O \\ \phantom{n-C_3H_7S}\searrow\!\!\!P\,S\,CH_2CH{=}CH \\ n\text{-}C_3H_7S \phantom{\searrow}\!\!\!\nearrow\|\phantom{O}\phantom{CH}\,\,\,| \\ \phantom{n-C_3H_7S\nearrow}O \phantom{CHCH_2S}CH_3 \end{array}$ | 55 | 50 | 94–5 (0.1) |
| $\begin{array}{c} C_2H_5O \\ \phantom{CH_2=CHCH_2S}\searrow\!\!\!P\,S\,CH_2CH{=}CH \\ CH_2{=}CHCH_2S \phantom{\searrow}\!\!\!\nearrow\|\phantom{O}\phantom{CH}\,\,\,| \\ \phantom{CH_2=CHCH_2S\nearrow}O \phantom{CH}CH_3 \end{array}$ | 48 | 43 | 90–4 (0.1) |
| $\begin{array}{c} CH_3O \\ \phantom{n-C_3H_7S}\searrow\!\!\!P\,S\,CH_2CH{=}CH \\ n\text{-}C_3H_7S \phantom{\searrow}\!\!\!\nearrow\|\phantom{O}\phantom{CH}\,\,\,| \\ \phantom{n-C_3H_7S\nearrow}O \phantom{CH}CH_3 \end{array}$ | 30 | — | 92 (0.15) |
| $\begin{array}{c} CH_3O \\ \phantom{CH_3S}\searrow\!\!\!P\,S\,CH_2CH{=}CH \\ CH_3S \phantom{\searrow}\!\!\!\nearrow\|\phantom{O}\phantom{CH}\,\,\,| \\ \phantom{CH_3S\nearrow}O \phantom{CH}CH_3 \end{array}$ | 64 | — | 71 (0.07) |
| $\begin{array}{c} CH_3O \\ \phantom{C_2H_5S}\searrow\!\!\!P\,S\,CH_2CH{=}CH \\ C_2H_5S \phantom{\searrow}\!\!\!\nearrow\|\phantom{O}\phantom{CH}\,\,\,| \\ \phantom{C_2H_5S\nearrow}O \phantom{CH}CH_3 \end{array}$ | 35 | — | 77.8 (0.1) |

EXAMPLE 13

Pesticidal effects of S-alkenyl O,S'-dialkyl dithiophosphates

| $\begin{array}{c} RO \\ \phantom{R'S}\searrow\!\!\!P\,S\,CH_2CH{=}CH_2 \\ R'S \phantom{\searrow}\!\!\!\nearrow\| \\ \phantom{R'S\nearrow}O \end{array}$ | $\begin{array}{c} RO \\ \phantom{RS}\searrow\!\!\!P\,S\,CH_2CH{=}CHCH_3 \\ RS \phantom{\searrow}\!\!\!\nearrow\| \\ \phantom{RS\nearrow}O \end{array}$ | $\begin{array}{c} RO \\ \phantom{R'S}\searrow\!\!\!P\,S\,CH{=}CHCH_3 \\ R'S \phantom{\searrow}\!\!\!\nearrow\| \\ \phantom{R'S\nearrow}O \end{array}$ |
|---|---|---|
| Table A | Tables B and C | Tables D and E |
| S-allyl O,S'-dialkyl dithiophosphates. | S-crotyl O,S'-dialkyl dithiophosphates. | S-propenyl O,S'-dialkyl dithiophosphates. |

In this example, the pesticidal effectiveness of the above types of S-alkenyl O,S'-dialkyl dithiophosphates was studied, and their pesticidal activity was compared with the corresponding known S-alkenyl O,O'-dialkyl dithiophosphate isomers:

$$\underset{\text{S-alkenyl O,S'-dialkyl dithiophosphate}}{\overset{RO}{\underset{R'S}{\diagdown}}\!\!\!\!P\!\!\!\overset{\|}{\underset{O}{\diagup}}\,S(CH_2)_{0\text{-}1}CH{=}CHR''} \quad \text{and} \quad \underset{\text{S-alkenyl O,O'-dialkyl dithiophosphate}}{\overset{RO}{\underset{R'O}{\diagdown}}\!\!\!\!P\!\!\!\overset{\|}{\underset{S}{\diagup}}\,S(CH_2)_{0\text{-}1}CH{=}CHR''}$$

$$R''{=}CH_3, H$$

Experimental procedures

In the insecticidal and miticidal spray tests the experimental compounds were tested as aqueous emulsions. These emulsions were prepared by dissolving the compound in acetone and dispersing it in distilled water with Triton X (an alkyl aryl polyether alcohol) to give spray emulsions containing 500 and 250 p.p.m. of the compound. These emulsions were then used in standard laboratory insecticidal and miticidal tests as described hereinafter.

Mexican bean beetle.—Bean leaves were dipped in the emulsion of the test chemical and allowed to dry. Individual treated leaves were placed in Petri dishes and four Mexican bean beetle larvae introduced into each of the two replicate dishes.

Southern army worm.—Bean leaves were dipped in a formulation of the test chemical and allowed to dry. Individual treated leaves were placed in Petri dishes and four southern army worm larvae introduced into each of two replicate dishes.

Mites, contact.—Potted bean plants infested with the two-spotted spider mite were placed on a turntable and sprayed with a formulation of the test chemical. The plants were held for 5 days and the degree of mite control was rated after 2 and 5 days.

Mites systemic.—Bean plants infested with the two-spotted mites were treated by applying 20 ml. of the formulated test chemical to the soil.

Aphid, contact.—Potted nasturtium plants infested with the bean aphids were placed on a turntable and sprayed with a formulation of the test chemical. The plants were held for 2 days and the degree of aphid control was rated.

Aphid, systemic.—Nasturtium plants infested with the bean aphid were treated by applying 20 ml. of the formulated test chemical to the soil.

Housefly.—Caged houseflies are sprayed with the formulated test chemical. After 2 days the degree of housefly control was rated.

Corn root worm.—This test was done in the soil with larvae 7–10 days old in the following manner. Seventy-five ml. (90–100 grams) of an air dried soil-sand (2:1) mixture was placed in an 8-ounce plasticized cup. Ten ml. of a 55 p.p.m. stock equivalent to 5 p.p.m. in soil or 10 pounds in a 6-inch deep acre, was pipetted onto the surface of the soil. The cup was capped and one hour later it was shaken vigorously thirty times. The cap was removed and two very young corn plants and five larvae were introduced. Readings on mortality were made five days later.

Root-knot nematode.—An air-dried 2:1 soil-sand mixture (125 ml.) in an 8-ounce plasticized container was infested with a stock of root-knot nematode prepared 7–10 days previously (at the rate of 6–7 grams of chopped galls per gallon of soil). Ten ml. of the formulated test chemical at 231 p.p.m. was poured onto the surface of the soil-sand mixture to give a rate equivalent to 25 pounds per 6" acre. The container was then capped and shaken vigorously 1 hour later. The container was kept for 5–7 days, then shaken again, and seeded with 4 cucumber seeds by placing the seeds on the surface and covering with ½" of sand. After 3–4 weeks the roots were examined for galls and the degree of control determined.

Cholinesterase inhibition.—To a solution of 0.2 unit of bovine cholinesterase in 2.97 ml. of a buffer solution containing 11.15 grams of disodium hydrogen phosphate dodecahydrate and 1.81 grams of potassium dihydrogen phosphate per liter of water, 0.03 ml. of a solution of an experimental dithiophosphate ester in acetone was added. This mixture was then incubated in a water bath at 35° C. for 30 min. One ml. of a solution containing 100 milligrams of 5,5'-dithiobis-(2-nitrobenzoic acid), 100 milligrams of acetylthiocholine iodide, and 75 ml. of the above buffer solution in sufficient water to make 200 ml. was then added and the mixture again incubated in a water bath at 35° C. for 30 minutes more. The amount of inhibition of bovine cholinesterase was then determined from the absorbance of this solution at 420 m$\mu$ (millimicron). By using a series of solutions of the test chemical at various concentrations in acetone, the concentration needed for 50% inhibition was determined.

The insecticidal effectiveness of organophosphorus compounds is generally attributed to cholinesterase inhibition. Determination of the cholinesterase inhibition is widely used to estimate the insecticidal potential of new organophosphorus compounds.

Results of all the foregoing tests are shown in Tables A–E herebelow.

TABLE A.—PESTICIDAL ACTIVITY OF S-ALLYL S'-ALKYL O-ETHYL AND METHYL DITHIOPHOSPHATE ESTERS $$\begin{array}{c} CH_3(CH_2)_{0-1}O \\ \diagdown \\ RS \diagup P \diagdown SCH_2CH=CH_2 \\ \parallel \\ O \end{array}$$

| Compound tested Structure | Conc., p.p.m. | Mortality produced (after days) percent | | | | | | House fly spray (1) | Special test corn rootworm | | Cholinesterase inhibiting conc., LD$_{50}$ (mole/liter) |
|---|---|---|---|---|---|---|---|---|---|---|---|
| | | Mexican bean beetle larvae (3) | Southern army worm (3) | Two spotted spider mites | | Bean aphids | | | Conc., p.p.m. | Mortality percent larvae (4) | |
| | | | | Contact (2) | Systemic (2) | Contact (2) | Systemic (2) | | | | |
| $(C_2H_5O)_2PSCH_2CH=CH_2$, $\parallel S$ | 500 / 250 | 0 | 0 | 0 | | | | 0 | 5.0 | 0 | 5.7×10⁻⁵ |
| $C_2H_5O \diagdown PSCH_2CH=CH_2$ $CH_3S \diagup \parallel O$ | 500 / 250 | 100 / 0 | 20 / 0 | 100 / 100 | 100 / 100 | — / 50 | 100 / 100 | 100 / 0 | 5.0 / 2.5 | 100 / 26 | 9.2×10⁻⁸ |
| $C_2H_5O \diagdown PSCH_2CH=CH_2$ $C_2H_5S \diagup \parallel O$ | 500 / 250 | 80 / 60 | 40 / 0 | 100 / 100 | 100 / 100 | 100 / 100 | 100 / 100 | — / 60 | 5.0 / 2.5 | 80 / 40 | 2.0×10⁻⁷ |
| $C_2H_5O \diagdown PSCH_2CH=CH_2$ $n-C_3H_7S \diagup \parallel O$ | 500 / 250 | 100 / 60 | — / 80 | 100 / 100 | 100 / 90 | 100 / 100 | 100 / 100 | 100 / 90 | 5.0 / 2.5 | 100 / 86 | 3.0×10⁻⁷ |
| $C_2H_5O \diagdown PSCH_2CH=CH_2$ $i-C_3H_7S \diagup \parallel O$ | 500 / 250 | 60 / 0 | 0 / 0 | 100 / 100 | 100 / 90 | 100 / 100 | 100 / 50 | — / 0 | 5.0 | 0 | 1.0×10⁻⁶ |
| $CH_3O \diagdown PSCH_2CH=CH_2$ $CH_3S \diagup \parallel O$ | 500 / 250 | — / 100 | — / 0 | — / 100 | — / 100 | — / 15 | — / 90 | 100 / 0 | 5.0 | 80 | 3.1×10⁻ |
| $CH_3O \diagdown PSCH_2CH=CH_2$ $C_2H_5S \diagup \parallel O$ | 500 / 250 | 40 / — | 0 / 100 | — / 100 | — / 100 | — / 80 | 100 / 50 | — / 80 | 5.0 / 2.5 | 60 / 50 | 2.3×10⁻⁶ |

TABLE B.—PESTICIDAL ACTIVITY OF S-CROTYL S'-ALKYL O-ETHYL DITHIOPHOSPHATE ESTERS $$\begin{array}{c} C_2H_5O \\ \diagdown \\ RS \end{array} P \begin{array}{c} SCH_2CH=CHCH_3 \\ \diagup \\ \parallel \\ O \end{array}$$

| Compound tested | | Conc., p.p.m. | Mortality produced (after days) percent | | | | | | | | | Special test corn rootworm | | Special test nematodes | | Cholinesterase inhibiting conc.; $LD_{50}$ (mole/liter) |
|---|---|---|---|---|---|---|---|---|---|---|---|---|---|---|---|---|
| | | | Mexican bean beetle larvae (3) | Southern army worm (3) | Two spotted spider mites | | | | Bean aphids | | House fly spray (1) | Conc., p.p.m. | Mortality, percent larvae (4) | Rate, lbs./acre | Control percent (1+4 wks.) | |
| | | | | | Contact | | Systemic | | Contact (2) | Systemic (2) | | | | | | |
| Structure | | | | | (2) | (5) | (2) | (5) | | | | | | | | |
| $(C_2H_5O)_2PSCH_2CH=CH$ with $\parallel S$ and $CH_3$ | | 500 / 250 | 0 / 0 | 0 / 0 | 0 ------ | ------ | 0 ------ | ------ | ------ | ------ | 100 / 15 | 5.0 / 2.5 | 30 ------ | 50 / 25 | 3 / 2 | $1.1\times10^{-5}$ |
| $\begin{array}{c}C_2H_5O\\ \diagdown\end{array}PSCH_2CH=CHCH_3$ with $\parallel S$ and $CH_3S$ | | 500 / 250 | 100 / 30 | 0 ------ | 100 / 65 | 0 / 0 | 100 / 12 | 0 / 0 | ------ | ------ | 100 / 65 | 5.0 / 2.5 | 85 / 100 | ------ | ------ | $3.7\times10^{-3}$ |
| $\begin{array}{c}C_2H_5O\\ \diagdown\end{array}PSCH_2CH=CHCH_3$ with $\parallel O$ and $CH_3S$ | | 500 / 250 | 100 / 80 | 0 ------ | 100 / 80 | 0 / 0 | 100 / 25 | 0 / 0 | ------ | ------ | 80 / 0 | 5.0 / 2.5 | 90 / 100 | 50 / 25 | 10 / 9 | $1.9\times10^{-5}$ |
| $\begin{array}{c}C_2H_5O\\ \diagdown\end{array}PSCH_2CH=CHCH_3$ with $\parallel O$ and $C_2H_5S$ | | 500 / 250 | 100 / 100 | 100 / 90 | 100 / 100 | 50 / 50 | 100 / 100 | 80 / 25 | 100 / 100 | 100 / 65 | 100 / 100 | 5.0 / 2.5 | 100 / 100 | 25 | 10 | $1.2\times10^{-5}$ |
| $\begin{array}{c}n\text{-}C_3H_7S\\ \diagdown\end{array}PSCH_2CH=CHCH_3$ with $\parallel O$ and $C_2H_5O$ and $CH_2=CHCH_2S$ | | 500 / 250 | 100 / 80 | 0 ------ | 90 / 100 | 40 / 10 | 100 / 90 | 90 / 20 | 100 ------ | 25 / 100 | 100 / 75 | 5.0 / 2.5 | 100 / 100 | ------ | ------ | $7.9\times10^{-7}$ |

TABLE C.—PESTICIDAL ACTIVITY OF S-CROTYL S'-ALKYL O-METHYL DITHIOPHOSPHATE ESTERS

| Compound tested | | Conc., p.p.m. | Mortality produced (after days) percent | | | | | | | | | Special test corn rootworm | | Special test nematodes | | Cholinesterase inhibiting conc.; $LD_{50}$ (mole/liter) |
|---|---|---|---|---|---|---|---|---|---|---|---|---|---|---|---|---|
| | | | Mexican bean beetle larvae (3) | Southern army worm (3) | Two spotted spider mites | | | | Bean aphids | | House fly spray (1) | Conc., p.p.m. | Mortality, percent larvae (4) res. | Rate, lbs./acre | Control percent (1+4 wks.) | |
| | | | | | Contact | | Systemic | | Contact (2) | Systemic (2) | | | | | | |
| Structure | | | | | (2) | (5) | (2) | (5) | | | | | | | | |
| $CH_3O\,PSCH_2CH=CHCH_3$ | | 500 / 250 | ------ | ------ | ------ | ------ | ------ | ------ | ------ | ------ | ------ | 5.0 / 2.5 | 100 / 90 | 30 | 40 | ------ |
| $\begin{array}{c}CH_3O\\ \diagdown\end{array}PSCH_2CH=CHCH_3$ with $CH_3O$ | | 500 / 250 | 100 / 100 | ------ | 100 / 100 | 0 / 0 | 100 / 100 | 90 / 60 | ------ | ------ | 100 ------ | 5.0 / 2.5 | 100 / 100 | 50 | 70 | $1.9\times10^{-5}$ |
| $\begin{array}{c}CH_3S\\ \diagdown\end{array}PSCH_2CH=CHCH_3$ with $CH_3O$ | | 500 / 250 | 0 ------ | ------ | 100 / 90 | 0 / 0 | 100 / 80 | 50 / 50 | 65 ------ | 75 ------ | 90 ------ | 5.0 / 2.5 | 100 / 100 | 50 | 40 | $1.1\times10^{-5}$ |
| $\begin{array}{c}C_2H_5S\\ \diagdown\end{array}PSCH_2CH=CHCH_3$ with $CH_3O$ and $n\text{-}C_3H_7S$ | | 500 / 250 | 0 ------ | ------ | 100 / 90 | 0 / 0 | 100 / 90 | 90 / 0 | 100 / 100 | 80 / 90 | 100 ------ | 5.0 / 2.5 | 100 / 100 | 50 | ------ | $9.0\times10^{-5}$ |

TABLE D.—PESTICIDAL ACTIVITY OF S-PROPENYL S'-ALKYL O-ETHYL DITHIOPHOSPHATE ESTERS $$\begin{array}{c} C_2H_5O \\ \diagdown \\ RS \diagup P \diagdown O \end{array} SCH=CHCH_3$$

| Compound tested Structure | Conc., p.p.m. | Mexican bean beetle larvae (3) | Southern army worm (3) | Two spotted spider mites Contact (2) | Two spotted spider mites Contact (5) | Two spotted spider mites Systemic (2) | Two spotted spider mites Systemic (5) | Bean aphids Contact (2) | Bean aphids Systemic (2) | House fly spray (1) | Special test corn rootworm Conc., p.p.m. | Special test corn rootworm Mortality percent larvae (4) | Root knot nematode Conc., lb./acre | Root knot nematode Control, percent | Cholinesterase inhibiting conc.; LiD₅₀ (mole/liter) |
|---|---|---|---|---|---|---|---|---|---|---|---|---|---|---|---|
| $(C_2H_5O)_2 P(=S) SCH=CHCH_3$ | 500 / 250 | 20 / 10 | 20 / 0 | 90 / 12 | 25 / 0 | 0 / 0 | — / 0 | 80 / 0 | 100 / 90 | 40 / — | 5.0 / 2.5 | 100 / 100 | 50 | 10 | 3.3×10⁻⁵ |
| $\begin{array}{c}C_2H_5O\\CH_3S\end{array} P(=O) SCH=CHCH_3$ | 500 / 250 | 100 / 100 | 100 / 40 | 95 / 20 | 0 / 0 | 85 / 0 | 0 / 0 | 100 / 85 | 100 / 100 | 100 / 95 | 5.0 / 2.5 | 100 / 80 | — | — | 2.35×10⁻⁷ |
| $\begin{array}{c}C_2H_5O\\C_2H_5S\end{array} P(=O) SCH=CHCH_3$ | 500 / 250 | 100 / 100 | 100 / 60 | 25 / 0 | 0 / 0 | 90 / 0 | 100 / 10 | 100 / 75 | 100 / 60 | 100 / 90 | 5.0 / 2.5 | 100 / 100 | 25 | 10 | 3.5×10⁻⁷ |
| $\begin{array}{c}C_2H_5O\\n\text{-}C_3H_7S\end{array} P(=O) SCH=CHCH_3$ | 500 / 250 | 100 / 100 | 100 / 100 | 100 / 100 | 80 / 0 | 100 / 100 | 100 / 100 | 100 / 100 | 100 / 100 | 100 / 100 | 5.0 / 2.5 | 80 / 100 | 50 | 100 | 1.5×10⁻⁶ |
| $\begin{array}{c}C_2H_5O\\n\text{-}C_6H_9S\end{array} P(=O) SCH=CHCH_3$ | 500 / 250 | 100 / — | 100 / 0 | 70 / 0 | 60 / 0 | 50 / — | 50 / — | 100 / — | 100 / — | 100 / 75 | 5.0 / 2.5 | 100 / — | 25 | 40 | 1.5×10⁻⁶ |
| $\begin{array}{c}C_2H_5O\\CH_2=CHCH_2S\end{array} P(=O) SCH=CHCH_3$ | 500 / 250 | 100 | 100 / 0 | 100 / 0 | 0 / 0 | 100 | 90 / — | — | 100 | 100 / 100 | 5.0 | 100 | 50 | 30 | 1.3×10⁻⁶ |
| $\begin{array}{c}C_2H_5O\\(CH_3)_2CHS\end{array} P(=O) SCH=CHCH_3$ | 250 | 100 | 0 | 80 | 50 | 100 | 50 | — | 100 | 100 | 5.0 | 100 | 25 | 80 | 6.3×10⁻⁶ |
| $\begin{array}{c}C_2H_5O\\(CH_3)_2CHCH_2S\end{array} P(=O) SCH=CHCH_3$ | 250 | 100 | 100 | 100 | 40 | 100 | 100 | 100 | 100 | 100 | 2.5 | 100 | 25 | — | 9.8×10⁻⁵ |
| $\begin{array}{c}C_2H_5O\\n\text{-}C_5H_{11}S\end{array} P(=O) SCH=CHCH_3$ | 250 | 100 | 0 | 0 | 90 | 80 | 0 | 20 | 20 | 0 | 2.5 | 20 | 25 | 50 | 3.5×10⁻⁷ |

TABLE E.—PESTICIDAL ACTIVITY OF S-PROPENYL S'-ALKYL O-METHYL AND O-n-PROPYL DITHIOPHOSPHATE ESTERS

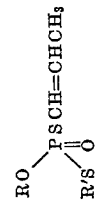

| Compound tested | | Conc., p.p.m. | Mortality produced (after days) percent | | | | | | | | | Special test corn rootworm | | | Special test nematodes | | Cholinesterase inhibiting conc.; LD₅₀ (mole/liter) |
|---|---|---|---|---|---|---|---|---|---|---|---|---|---|---|---|---|---|
| | | | Mexican bean beetle larvae (3) | Southern army worm (3) | Two spotted spider mites | | | | Bean aphids | | House fly spray (1) | Conc., p.p.m. | Mortality, percent vae (4) res. | | Rate, lbs./acre | Control percent (1+4 wks.) | |
| Structure | | | | | Contact (2) | (5) | Systemic (2) | (5) | Contact (2) | Systemic (2) | | | | | | | |
| CH₃O\P S CH=CHCH₃ / CH₃O ‖S | | 500 | 80 | 0 | 80 | 0 | — | — | 100 / 90 | 100 / 90 | 40 | 2.5 | 100 | | 50 | 90 | 3.3×10⁻⁶ |
| CH₃O\P S CH=CHCH₃ / CH₃S ‖O | | 500 / 250 | — / 100 | — / 100 | 70 / 10 | 70 / 10 | — | — | 100 | 80 | 100 | 2.5 | 90 | | 50 | 80 | 3×10⁻⁵ |
| CH₃O\P S CH=CHCH₃ / CH₃O ‖O | | 500 / 250 | — / 100 | — / 0 | 95 / 20 | 50 | 100 / 100 | 90 | 100 | 80 | 100 | 2.5 | 90 | | 50 | 10 | 6.7×10⁻⁷ |
| C₂H₅O\P S CH=CHCH₃ / CH₃O ‖O | | 500 / 250 | — / 100 | — / 100 | 100 | 40 | 90 | 50 | 100 | 100 | 100 | 2.5 | 100 | | | | 2.3×10⁻⁵ |
| n-C₃H₇O\P S CH=CHCH₃ / n-C₃H₇S ‖O | | 250 | 0 | 0 | 50 | 0 | 0 | 0 | 40 | 40 | 10 | 5.0 | 0 | | 25 | 10 | |
| n-C₃H₇O\P S CH=CHCH₃ / n-C₃H₇O ‖S | | 250 | 100 | 0 | 60 | 0 | 0 | 50 | 100 | 100 | 100 | 2.5 | 100 | | 25 | 80 | 8.3×10⁻⁸ |
| n-C₃H₇O\P S CH=CHCH₃ / CH₃S ‖O | | 250 | 100 | 0 | 60 | 0 | 0 | 0 | 100 | | 100 | 2.5 | 40 | | | | 2.4×10⁻⁷ |

The pesticidal data included above in Tables A-E show that S-alkenyl O,S'-dialkyl dithiophosphates are generally more active than the corresponding known S-alkenyl O,O'-dialkyl dithiophosphates. The data also show that for maximum activity the O-alkyl group should be methyl or ethyl while the S'-alkyl group could range from methyl to butyl. S-alkenyl S'-n-propyl O-alkyl dithiophosphate esters showed a particularly high level of activity in each of the groups studied.

Analysis of pesticidal data of Table A, of Tables B and C, and of Tables D and E Pesticidal data of Table A.—The results set forth in Table A show that, in general, the S-allyl-O,S'-dialkyl dithiophosphates are insecticidally and miticidally active. When the activity of these compounds is compared to that of the S-allyl-O,O'-dialkyl dithiophosphates, it can be seen that the compounds of this invention are much more effective. In particular, without intending to be limited by any theory which attempts to explain or account for the differences aforenoted in pesticidal activity, it can be said that the O-ethyl-S-n-propyl grouping seems to impart a broader spectrum of insecticidal activity to the molecule.

Pesticidal data of Tables B and C.—The S-crotyl-O,S'-dialkyl dithiophosphates are, in general, insecticidally and miticidally active as shown by the results set forth in Tables B and C. As compared to the S-crotyl-O,O'- dialkyl dithiophosphates, the S-crotyl O,S'-dialkyl dithiophosphates proved to be more biologically active. Again, without wishing or intending to be bound by any theory, it would appear that the O-ethyl S-n-propyl grouping in this series, as with the S-allyl series, extends the range of insecticidal activity of this molecule.

Pesticidal data of Tables D and E.—It would seem apparent from the results set forth in Tables D and E that the S-propenyl O,S'-dialkly dithiophosphates are, in general, biologically active. These results also indicate the tremendously enhanced activity of these compounds as compared to the S-propenyl-O,O'-dialkyl dithiophosphates. As seen for the S-allyl and S-crotyl O,S'-dialkyl dithiophosphates (Tables A and B, C, respectively), the O-ethyl-S-n-propyl grouping enhances the broad spectrum activity of the S-propenyl dithiophosphates. Data in Table E also show that, as one proceeds up the homologous series with respect to the O-alkyl group, i.e., from O-methyl to O-n-propyl, there is a corresponding decrease of activity of S-propenyl O,S'-dialkyl dithiophosphates. In contrast the presence of an S-n-propyl group again appears to increase the activity.

EXAMPLE 14

Control of two-spotted spider mites with 4-chloro benzyl-isothiuronium S-crotyl O-ethyl dithiophosphate 4-chlorobenzylisothiuronium S-crotyl O-ethyl dithiophosphate gave 80 percent control of the two-spotted spider mite when treated as a contact spray at 500 p.p.m. concentration.

EXAMPLE 15

Soil fungi test

In this example, S-methyl-S'-propenyl O-1-propyl dithiophosphate was tested against soil fungi in the following manner. Sterilized soil was inoculated with a soil fungus, e.g. Sclerotium. The soil was then placed in a 4 oz. cup and drenched with 20 ml. of a formulation of the test chemical. The treated soil samples were incubated for 2 days at 21° C. and the amount of mycelial growth on the soil was then rated.

In this test against Sclerotium, S-methyl-S'-propenyl O-1-propyl dithiophosphate gave control of the fungus down to a rate of 12.5 lbs./acre.

EXAMPLE 16

Toxicity of S-alkenyl O,S'-dialkyl dithiophosphate esters to warm blooded animals In this example, the toxicity of the present S-alkenyl O,S'-dialkyl dithiophosphates, was determined with respect to warm blooded animals. Oral toxicity determinations on mice and rats were used to determine the median lethal concentration of test compounds. ($LD_{50}$, mg. compound/kg. animal). Toxicity determinations were also made on closely related known compounds to determine structure-toxicity correlations. Results of these determinations are shown in Table F.

TABLE F.—MEDIAN ACUTE ORAL TOXICITY OF UNSATURATED DIALKYL DITHIOPHOSPHATES

| Structure | Animal used | (mg./kg.) |
|---|---|---|
| $CH_3O\diagdown$<br>$\qquad\diagup P-SCH=CHCH_3$<br>$CH_3O\diagup\;\|$<br>$\qquad\qquad O$ | Mice | 10 |
| $CH_3O\diagdown$<br>$\qquad\diagup P-SCH=CHCH_3$<br>$CH_3O\diagup\;\|$<br>$\qquad\qquad S$ | Mice | 1,000 |
| $CH_3O\diagdown$<br>$\qquad\diagup P-SCH=CHCH_3$<br>$CH_3S\diagup\;\|$<br>$\qquad\qquad O$ | Mice | 271 |
| $CH_3O\diagdown$<br>$\qquad\diagup PSCH=CHCH_3$<br>$C_2H_5S\diagup\;\|$<br>$\qquad\qquad O$ | Mice | 233 |
| $CH_3O\diagdown$<br>$\qquad\diagup P-SCH_2CH=CH$<br>$CH_3O\diagup\;\|\qquad\qquad\|$<br>$\qquad\qquad O\qquad\quad CH_3$ | Mice | 200<br>400 |
| $CH_3O\diagdown$<br>$\qquad\diagup P-SCH_2CH=CH$<br>$CH_3O\diagup\;\|\qquad\qquad\|$<br>$\qquad\qquad S\qquad\quad CH_3$ | Mice | 2,000 |
| $CH_3O\diagdown$<br>$\qquad\diagup P-SCH_2CH=CH$<br>$CH_3S\diagup\;\|\qquad\qquad\|$<br>$\qquad\qquad O\qquad\quad CH_3$ | Rats | 46.5 |
| $C_2H_5O\diagdown$<br>$\qquad\diagup P-SCH=CHCH_3$<br>$C_2H_5O\diagup\;\|$<br>$\qquad\qquad O$ | Mice<br>Rats | 10<br>14.7 |
| $C_2H_5O\diagdown$<br>$\qquad\diagup P-SCH=CHCH_3$<br>$C_2H_5O\diagup\;\|$<br>$\qquad\qquad S$ | Mice<br>Rats | 25<br>65.5 |
| $C_2H_5O\diagdown$<br>$\qquad\diagup P-SCH=CHCH_3$<br>$C_2H_5S\diagup\;\|$<br>$\qquad\qquad O$ | Rats | 147 |
| $C_2H_5O\diagdown$<br>$\qquad\diagup P-SCH=CHCH_3$<br>$CH_3S\diagup\;\|$<br>$\qquad\qquad O$ | Mice | 108 |
| $C_2H_5O\diagdown$<br>$\qquad\diagup P-SCH=CH_2$<br>$C_2H_5O\diagup\;\|$<br>$\qquad\qquad S$ | Rats | 31.6 |
| $C_2H_5O\diagdown$<br>$\qquad\diagup P-SCH_2CH_2CH_3$<br>$C_3H_7S\diagup\;\|$<br>$\qquad\qquad O$ | Rats | 61 |

The toxicity data set forth in Table F shows different effects in the case of the dimethyl and the diethyl dithiophosphate derivatives. Vinylic and allylic dimethyl dithiophosphates are highly nontoxic to warm blooded animals before isomerization. The isomerization of these compounds apparently results in increased toxicity. In the case of the vinylic (and allylic) diethyl dithiophosphates, the compounds have a moderately high toxicity to begin with. Isomerization of these compounds does somewhat reduce the toxicity. This reduction of toxicity is especially important since the ethyl derivatives are generally more stable than the methyl derivatives and as such are more practical to use for a continued control of agricultural and animal pests.

In conclusion, it has been seen that the S-alkenyl O-alkyl dithiophosphates and S-alkenyl O,S'-dialkyl dithiophosphates are useful as pesticides, particularly as insecticides, miticides, and nematocides. Compared with known phosphate insecticides, the low toxicity of some of the compounds of the present invention towards warm-blooded animals is believed unusual. While not wishing to be bound by any particular theory or theories, it is nevertheless believed that this low toxicity is due to the presence of vinylic or allylic unsaturation.

In addition to their demonstrated utility as pesticides, particularly as insecticides, miticides, and nematocides, the present dealkylates and alkylated compounds of this invention can be used also as animal health agents, antioxidants, lubricating oil additives, etc.; moreover, the S-alkenyl, O,S'-dialkyl dithiophosphate products of this invention are also useful as chemical intermediates.

It is to be understood that the invention is not limited to the various embodiments or specific examples shown above, since these have been offered merely as illustrations, and it is manifest that other dealkylated and alkylated S-allylic and vinylic O,O'-dialkyldithiophosphate derivatives can be prepared and used and other modifications can be made thereof without departing from the spirit and purview of this invention.

What is claimed is:

1. S-alkenyl O,S'-dialkyl dithiophosphates of the formula:

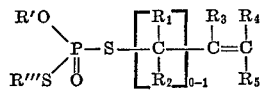

wherein R' and R''' are $C_1$ to $C_{16}$ alkyl radicals and $R_1$ to $R_5$ are selected from the group consisting of hydrogen, $C_1$-$C_{16}$ alkyl, chlorine and cyano.

2. S-alkenyl O,S'-dialkyl dithiophosphates according to claim 1 wherein R' and R''' are $C_1$ to $C_6$ alkyl and $R_1$ to $R_5$ are each selected from the group consisting of hydrogen, chlorine, cyano, $C_1$ to $C_4$ alkyl.

3. S-alkenyl O,S'-dialkyl dithiophosphates according to claim 1 wherein R' and R'' are $C_1$ to $C_6$ alkyl and $R_1$ to $R_5$ are either hydrogen or methyl.

4. Compounds of the formula:

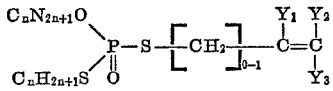

wherein $Y_1$ to $Y_3$ are selected from the group consisting of hydrogen, methyl, chlorine, cyano and $n$ is 1 to 6.

5. Compounds according to claim 4 wherein $Y_1$ to $Y_3$ are either hydrogen or methyl and $n$ is an integer ranging from 1 to 6.

6. Compounds of the formula:

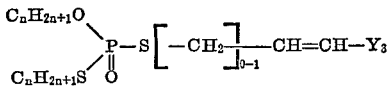

wherein $Y_3$ is hydrogen, methyl, chlorine, cyano and $n$ is 1 to 6.

7. Compounds according to claim 6 wherein $Y_3$ is either hydrogen or methyl and $n$ is an integer ranging from 1 to 6.

8. Compounds of the formula:

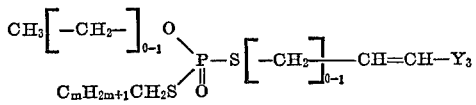

wherein $Y_3$ is hydrogen, methyl, chlorine, cyano and $m$ is 1 to 4.

9. Compounds according to claim 8 wherein Y is either hydrogen or methyl and $m$ is an integer ranging from 1 to 4.

10. Compounds of the formula:

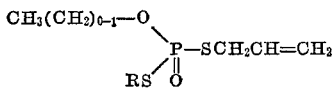

wherein R is methyl, ethyl, propyl.

11. Compounds of the formula:

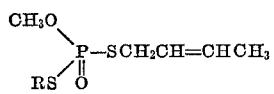

wherein R is methyl, ethyl, propyl.

12. Compounds of the formula:

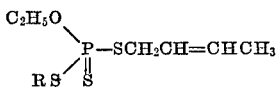

wherein R is methyl, ethyl, propyl.

13. Compounds of the formula:

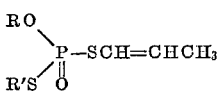

wherein R is methyl, n-propyl; R' is methyl, ethyl, n-propyl.

14. Compounds of the formula:

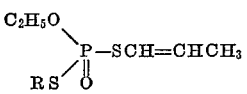

wherein R is methyl, ethyl, propyl, n-butyl, p-isobutyl, n-pentyl.

15. A compound of the formula:

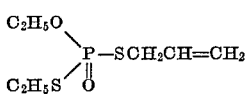

16. A compound of the formula:

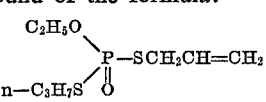

17. A compound of the formula

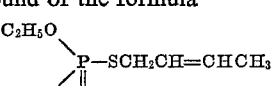

18. A compound of the formula

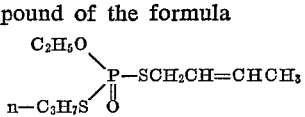

19. A compound of the formula

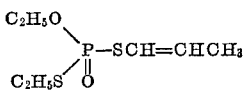

20. A compound of the formula

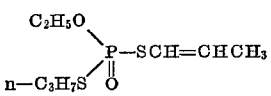

References Cited

UNITED STATES PATENTS 3,021,352  2/1962  Miller _____ 260—957 X

JOSEPH REBOLD, Primary Examiner

A. H. SUTTO, Assistant Examiner

U.S. Cl. X.R.

252—46.6, 400; 260—313, 429.9, 465.7, 633, 650 R, 654 R, 925, 928, 930, 940, 941, 946, 948, 950, 956, 979, 987; 424—219